(12) United States Patent
Vollmer

(10) Patent No.: US 9,625,020 B2
(45) Date of Patent: Apr. 18, 2017

(54) SHIFTING ARRANGEMENT FOR A DUAL CLUTCH TRANSMISSION

(71) Applicant: AUDI AG, Ingolstadt (DE)

(72) Inventor: Frank Vollmer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 1 day.

(21) Appl. No.: 14/439,470

(22) PCT Filed: Oct. 23, 2013

(86) PCT No.: PCT/EP2013/003186
§ 371 (c)(1),
(2) Date: Apr. 29, 2015

(87) PCT Pub. No.: WO2014/067634
PCT Pub. Date: May 8, 2014

(65) Prior Publication Data
US 2015/0285352 A1    Oct. 8, 2015

(30) Foreign Application Priority Data

Oct. 30, 2012 (DE) ..................... 10 2012 021 293

(51) Int. Cl.
*F16H 37/04*  (2006.01)
*F16H 3/00*  (2006.01)

(52) U.S. Cl.
CPC ........... *F16H 37/046* (2013.01); *F16H 3/006* (2013.01); *F16H 37/042* (2013.01);
(Continued)

(58) Field of Classification Search
CPC .................................................. F16H 2037/47
See application file for complete search history.

(56) References Cited

U.S. PATENT DOCUMENTS 7,140,267 B2   11/2006   Haka
7,353,724 B2   4/2008    Chen
(Continued)

FOREIGN PATENT DOCUMENTS

DE   10133629   1/2003
DE   10206584   9/2003
(Continued)

OTHER PUBLICATIONS

Dudley, Gear Handbook The Design Manufacture, and Application of Gears, 1967, McGraw-Hill Book Company, First Edition, pp. 3-14 and 3-15.*

(Continued)

*Primary Examiner* — Derek D Knight
*Assistant Examiner* — Timothy M Hannon
(74) *Attorney, Agent, or Firm* — Henry M. Feiereisen LLC.

(57) ABSTRACT

A shifting arrangement for a dual clutch transmission as a change-speed transmission for motor vehicles, with two coaxially arranged input shafts, each of which can be activated via a respective clutch, an axially parallel output shaft and gear sets arranged on the shafts and shiftable by means of synchronous clutches to form a plurality of forward gears and one reverse gear, wherein the gear sets are subdivided into a first subtransmission with one of the input shafts and a second subtransmission with the other input shaft. A pre-shifting unit and/or post-shifting unit shiftable into at least two transmission ratio stages is associated with the first subtransmission and/or the second subtransmission.

6 Claims, 3 Drawing Sheets

(52) U.S. Cl.
CPC .......... *F16H 2037/047* (2013.01); *F16H 2200/2007* (2013.01); *F16H 2200/2041* (2013.01)

(56) References Cited

U.S. PATENT DOCUMENTS

| | | |
|---|---|---|
| 7,914,412 B2 | 3/2011 | Gitt |
| 8,561,493 B2 | 10/2013 | Hoffmann |
| 2003/0148847 A1 | 8/2003 | Kawamoto |
| 2009/0036247 A1* | 2/2009 | Earhart ............... F16H 37/0833 475/35 |
| 2009/0280942 A1* | 11/2009 | Gumpoltsberger ..... F16H 3/006 475/31 |

FOREIGN PATENT DOCUMENTS

| | | |
|---|---|---|
| DE | 102004050922 | 6/2005 |
| DE | 102006054366 | 6/2007 |
| DE | 102006007010 | 8/2007 |
| DE | 102006015661 | 10/2007 |
| DE | 102006028798 | 1/2008 |
| DE | 102008001200 | 10/2009 |
| DE | 102009024240 | 2/2010 |
| DE | 102008054477 | 6/2010 |
| DE | 102011005029 | 9/2012 |

OTHER PUBLICATIONS

DE102009024240 translation.*
International Search Report issued by the European Patent Office in International Application PCT/EP2013/003186 on Oct. 23, 2013.

* cited by examiner

Fig. 4
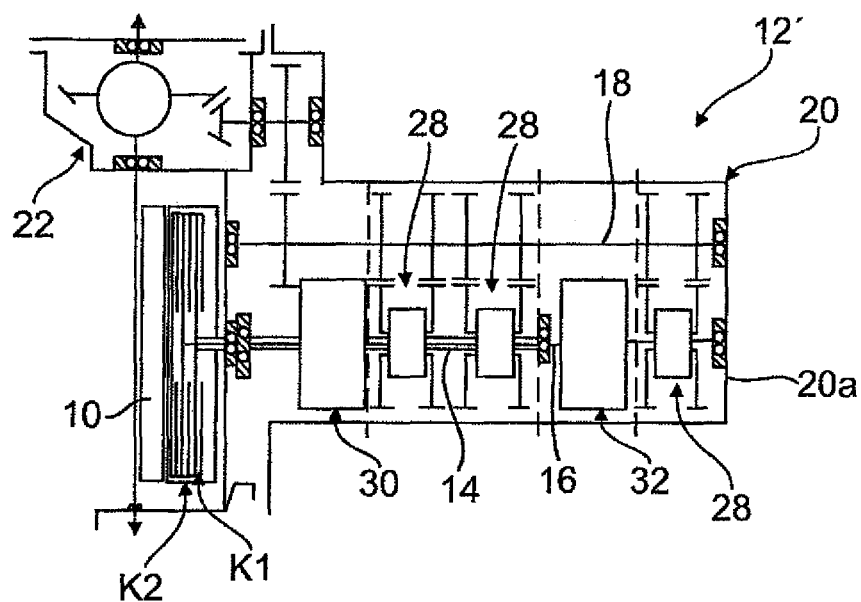
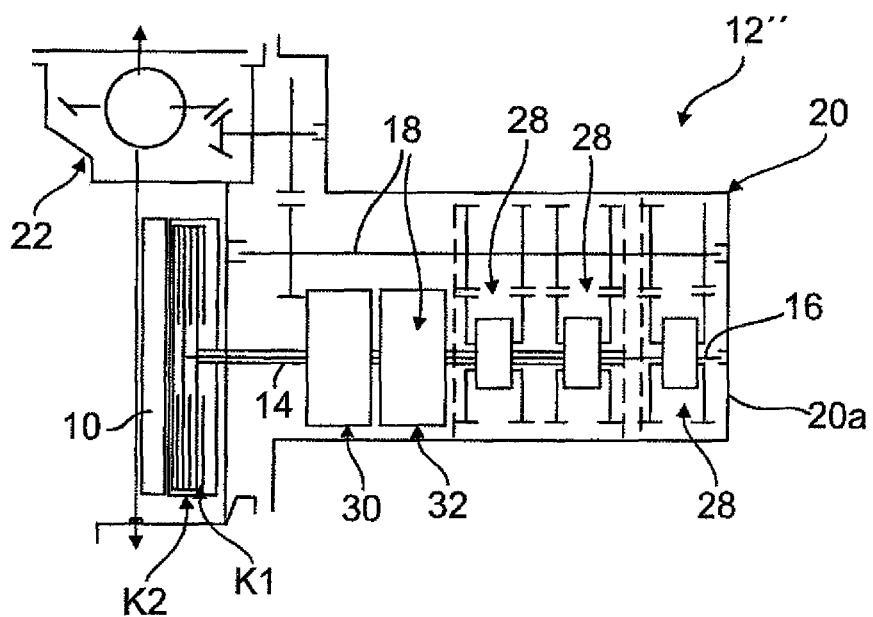
Fig. 5

SHIFTING ARRANGEMENT FOR A DUAL CLUTCH TRANSMISSION

CROSS-REFERENCES TO RELATED APPLICATIONS

This application is the U.S. National Stage of International Application No. PCT/EP2013/003186, filed Oct. 23, 2013, which designated the United States and has been published as International Publication No. WO 2014/067634 and which claims the priority of German Patent Application, Serial No. 10 2012 021 293.3, filed Oct. 30, 2012, pursuant to 35 U.S.C. 119(a)-(d).

BACKGROUND OF THE INVENTION

The present invention relates to a switching device for a dual clutch transmission as change-speed gearbox for motor vehicles.

Such twin clutch transmissions can be used automated switching transmissions with good transmission efficiency, and due to the division into two subtransmissions and two separating clutches can be shifted fast and without interruption of traction. In order to optimally adjust such change speed transmissions to the drive power of the drive aggregate or internal combustion engines, a great transmission spacing is desired, which can be realized for example by providing a higher number of forward gears (in the absence of excessive transmission steps).

SUMMARY OF THE INVENTION

It is an object of the present invention to set forth a dual clutch transmission of the generic type which enables great transmission spacing and in an increased number of forward gears, while at the same time being of compact construction and well manageable in terms of control.

The object is solved with the features of the independent patent claim. Advantageous embodiments and refinements of the invention are set forth in the dependent claims.

According to the characterizing part of claim 1 at least one a pre-shifting unit and/or a post-shifting unit is assigned to the subtransmission A and/or the subtransmission B, which pre-shifting unit and post-shifting unit can be shifted between two different transmission stages. The integrated pre- and/or post-shifting unit makes it possible to multiply the forward gears in the subtransmissions A and B, wherein in spite of the realizable greater transmission spacing the number of gear wheel sets can be reduced. This is possible without increasing the overall length of the transmission and the additional costs can be kept relatively low.

For example assignment of a pre- and or post shifting unit to the subtransmission A results in twice the number of gears of the subtransmission A. in addition in this case a greater transmission spacing can also be achieved n the subtransmission A.

The pre- an/or prost shifting unit can generally be configured in a layshaft design, for example as performer stage, a pre- or post-shifting group or in another appropriate design. Particularly preferably the pre- and post shifting unit can be realized as planetary transmission.

In the following, optional refinements of the invention are described in particular in connection with a shifting unit which is configured as a planetary transmission. It is understood, however, that the generally achieved advantages can also be achieved with differently constructed shifting units. Insofar the following discussion also applies to shifting units that are not constructed as planetary transmission.

Thus in a first preferred embodiment the one planetary transmission can be positioned adjacent the dual clutch K1, K2 on the input hollow shaft of the subtransmission A and the second planetary transmission can be positioned in force flux direction downstream of the gearwheel sets of both subtransmissions A, B on the output shaft. With this both planetary transmissions are advantageously spatially situated outside the gear wheel sets of the two subtransmissions. The transmission stages that are formed by the gear wheel sets can be quadrupled for the subtransmission A and doubled for the subtransmission B, which allows generating defined gear steps.

In a further alternative embodiment of the invention the one planetary transmission can be arranged adjacent the dual clutch on the input hollow shaft of the subtransmission A and the other planetary transmission can be arranged coaxially on the input shaft of the subtransmission B. this enables a doubling of the transmission stages of both subtransmissions A and B while enabling a particularly compact construction of the transmission.

In a third alternative embodiment of the invention both planetary transmissions can be arranged directly behind each other and arranged on the input hollow shaft of the subtransmission A. this enables depending on the circumstances the integration of both planetary transmissions in a single structural and mounting unit. Further the transmission stages of the subtransmission A can be quadrupled while the transmission stages of the subtransmission B, however can only be used singularly.

As mentioned above the pre- and/or post shifting unit can generally be shifted between two different transmission stages. Especially in the configuration as a planetary transmission the two transmission stages can be a first 1:1 transmission stage and a second lower (or higher) transmission stage. Such a planetary transmission has an input element, an output element and a transmission element which can be blocked via a brake B for shifting the lower transmission stage. Further, the planetary transmissions can be shiftable into the higher 1:1 transmission stage via a clutch K3, wherein the clutch respectively connects two elements of the planetary transmissions with each other. The clutch can be a conventional hydraulically controlled multidisc clutch and the brake can be a hydraulically operable disc brake or can be configured similar to a multi-disc clutch, so that comfortable, jolt fee shifting without interruption of traction is possible.

In a preferred transmission configuration which is advantageous in terms of construction, the input element of the planetary transmissions can be a ring gear, the output element a planet gear carrying web and the transmission element a sun gear which meshes with the planet gears, and which can be blocked via the brake B or can be connected with one of the other elements via the clutch K3. The clutch K3 can be provided between the driving ring gear and the sun gear.

Further the brake B and the clutch K3 can be constructively simple arranged on a common hollow shaft with the sun gear.

In an advantageous refinement of the invention it is proposed that the two planetary transmissions are of essentially the same construction, optionally however have different transmission ratios in the lower transmission stage in order to realized targeted gear steps which are adjusted to the transmission stages by the gear wheel sets.

BRIEF DESCRIPTION OF THE DRAWING

In the following multiple exemplary embodiments of the invention are explained in more detail by way of the included schematic drawing. It is shown in:

FIG. 4 an alternative shifting arrangement of the dual clutch transmission with a pre-shifting unit arranged upstream of the subtransmission A and subtransmission B;

FIG. 5 a further alternative shifting arrangement with two shifting units arranged directly behind each other and arranged on the input shaft.

DETAILED DESCRIPTION OF PREFERRED EMBODIMENTS

Figure 1:
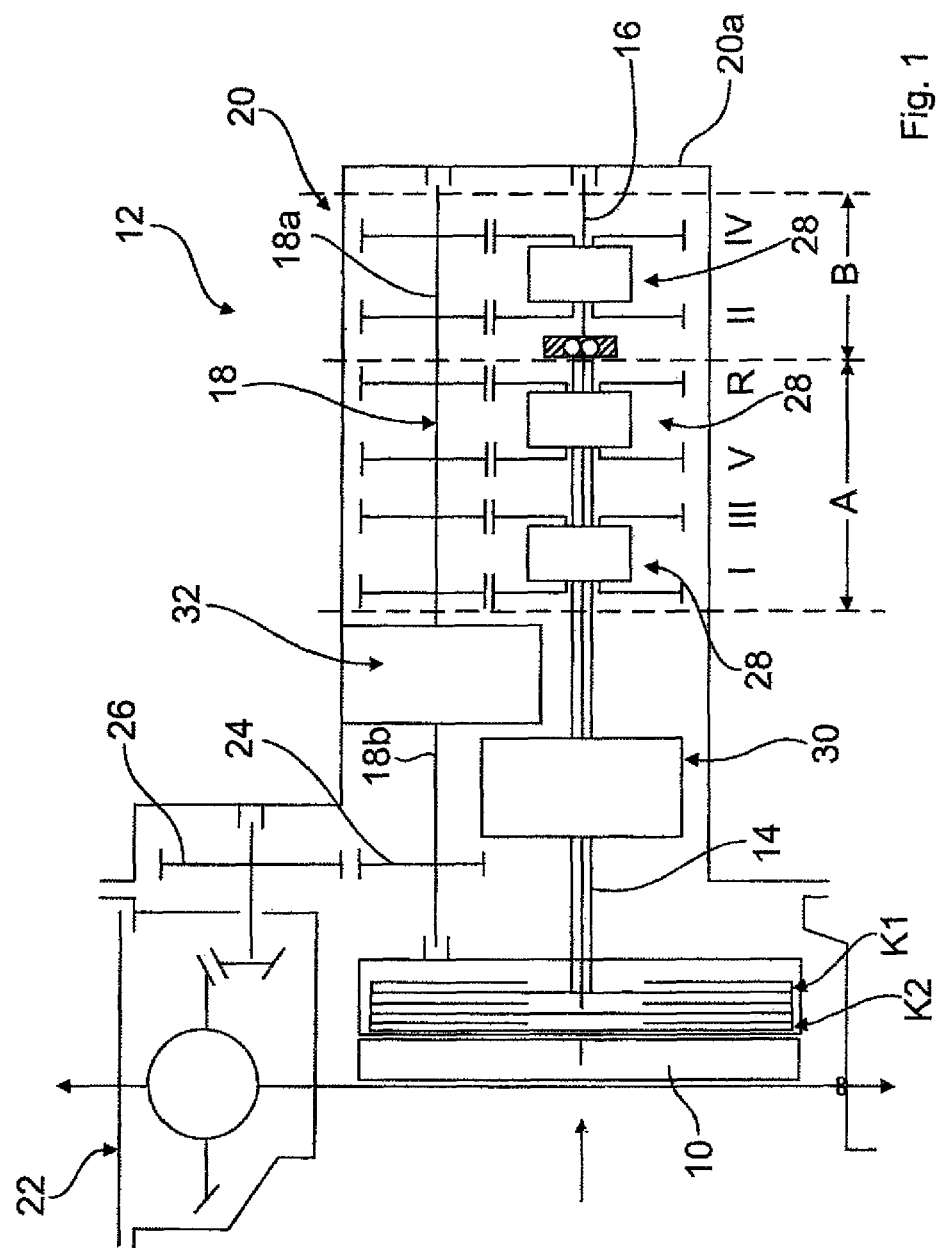
FIG. 1 a block diagram of a dual clutch transmission for a motor vehicle with subtransmissions A and B which have gear wheel sets, wherein a pre-shift unit is arranged upstream of to the subtransmission A, for example a planetary transmission, and a post shifting unit for example a planetary transmission is arranged on the output shaft downstream of the subtransmission A.

FIG. 1 shows very schematically a dual clutch transmission 12 as change-speed transmission for motor vehicles, with two coaxial transmission input shafts 14, 16 which can be drivingly connected with a driving drive aggregate or an internal combustion engine (not shown) via two separating clutches K1, K2. The input shaft 14 is configured as hollow shaft. The dual clutch K1, K2 can be assigned a rotation damper for example a two-mass flywheel 10.

Arranged axially parallel to the input shafts 14, 16 is an output shaft 18, which outputs onto a front axle differential 22 (only schematically indicated) which is attached to the transmission housing 20.

The mentioned shafts 14, 16, 18 are rotatably supported in the housing 20 via only schematically indicated rolling bearings (without reference signs).

The dual clutch transmission 12 is divided into a subtransmission A and a subtransmission B, wherein the input hollow shaft 14 only extends within the subtransmission A while the input shaft 16 extends through the input shaft 14 into the subtransmission B up to its end wall 20a.

In the subtransmission A three forward-gear gearwheels I, III, V and a reverse gear gearwheel set with integrated reversing gear (not shown) is arranged, which are formed in a manner known per se by fixed gears and idler gears, wherein the idler gears can be shifted via synchronizing clutches (generally designated 28).

In the subtransmission B two forward gear gearwheel sets II and IV are provided which are also formed by fixed gears and idler gears which can be shifted via synchronizing clutch 28 and which form the forward gears in the corresponding transmission configuration.

A first planetary transmission 30 is arranged upstream of the subtransmission A adjacent the dual clutch K1, K2, which planetary transmission is configured coaxial to the input hollow shaft 14 and which can be shifted between two transmission stages or between a lower transmission stage and a higher 1:1 transmission stage.

Further a second planetary transmission 32 as a post shifting unit of essentially the same construction is integrated in the output shaft 18 in force flux direction downstream of the mentioned gear wheel sets I to V and R.

Figure 2:
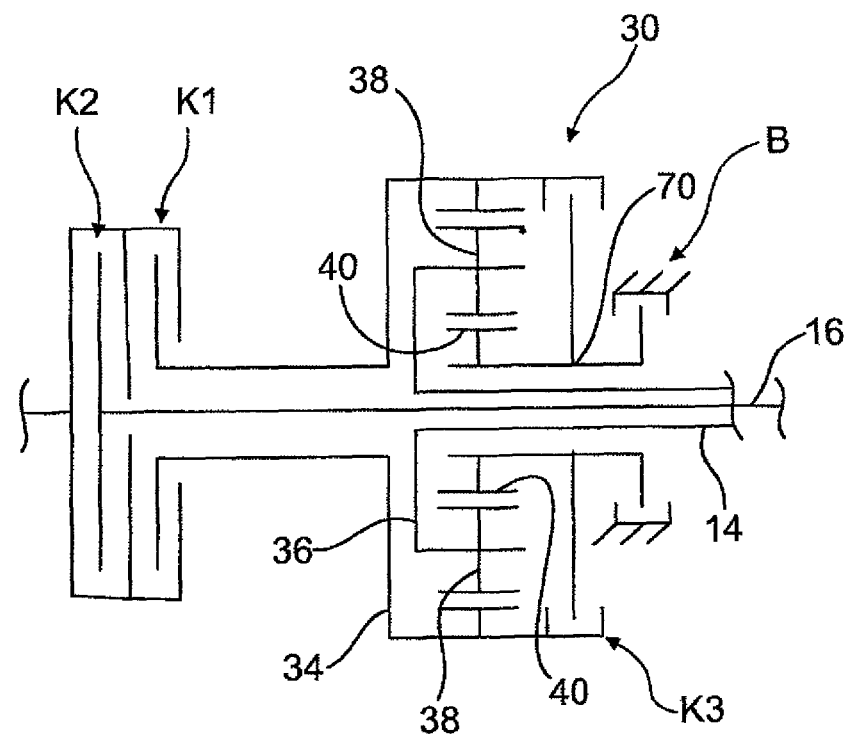
FIG. 2 the schematic representation of the upstream arranged planetary transmission according to FIG. 1 with ring gear, a web with planet gears and a sun gear, and a clutch and a brake for shifting between the transmission stages.
Figure 3:
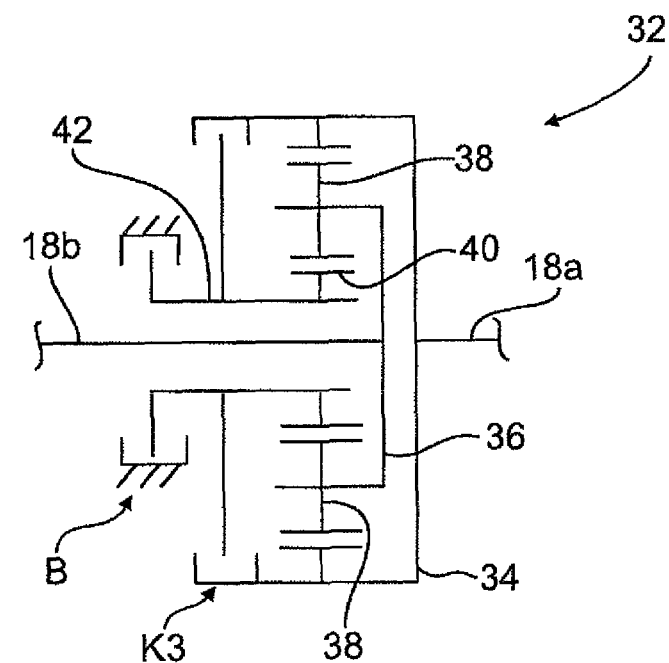
FIG. 3 the planetary transmission of the dual clutch transmission integrated on the output shaft which is essentially constructed identical to that of FIG. 2.

FIGS. 2 and 3 show schematically the planetary transmissions 30 or 32 whose corresponding transmission elements are provided with the same reference signs.

The planetary transmission 30 (FIG. 2) which is mounted to the dual clutch K1, K2 has a ring gear as input element which is drivingly connected to the clutch K1, a web 36 with rotatably supported planet gears 38 as output element and a sun gear 40 as transmission element.

The web 36 is directly drivingly connected with the input hollow shaft 14 of the subtransmission A, while the sun gear 40 is connected to the housing fixed brake B via a further hollow shaft 42. The brake B is preferably constructed similar to a multi-disc clutch or a s disc brake and cam be hydraulically actuated.

Further a multi-disc clutch K3 is provided between the ring gear 34 and the hollow shaft 42 or the sun gear 40, which clutch K3 when hydraulically actuated connects the ring gear 34 with the sun gear 40 and with this forms the 1:1 transmission ration of the planetary transmission 30. The clutch K1 then drives the hollow shaft 14 of the subtransmission A via the blocked planetary transmission 30.

The planetary transmission can be shifted to the lower transmission stage in that the clutch K3 is disengaged and the brake B is actuated. Then the engaged clutch K1 drives the input hollow shaft 14 via the planet gears 38, the ring gear 34 and the web 36, while the sun gear 40 is braked fixed as support element.

The planetary transmission 32 differs form the planetary transmission 30 described above only in that it is integrated in the output shaft 18, wherein the section 18a of the output shaft 18 which carries the fixed gears (FIG. 1) is connected with the ring gear 34 and the outputting web 36 is drivingly connected with the continuing section 18b of the output shaft 18.

As a result of the arrangement of the planetary transmission 30 in the subtransmission A each gear wheel set I, III, V and the reverse gear gearwheel set R can be driven in two transmission ratios, and thus forms eight gears of defined transmission ratio configurations.

The gear wheel sets II and IV can also be driven via the planetary transmission 32 integrated in the output shaft 18 in two transmission ratios, correspondingly thus further four forward gears.

Further in cooperation of the two planetary transmissions 30, 32 further transmission ration configurations can be driven so that here theoretically the number of the gears is quadrupled.

This enables achieving a great transmission spacing, by using optionally not all theoretically possible gears, a great transmission spacing at defined transmission ratio steps. The transmission control (not shown) hereby preferably shifts, without interruption of traction, the gear wheel sets of the subtransmission A or the subtransmission B by coupling the synchronizing clutch 28 active and controls the two planetary transmissions 30, 32 depending on the driving situation, into the lower or the higher 1:1 transmission ratio.

FIGS. 4 and 5 show alternative dual clutch transmissions 12', 12" which are only explained insofar as they differ from the ducal clutch transmission 12 according to FIG. 1. Functionally same parts are provided with the same reference signs.

According to FIG. 4, the second planetary transmission 32 is not integrated into the output shaft 18 but into the second input shaft 16 of the subtransmission B.

As a consequence the gear wheel sets II, IV (according to FIG. 1) of the subtransmission B can already be shifted in two transmission stages on the input side; an interaction (serial connection) of the two planetary transmissions 30, 32 is not possible in this case.

FIG. 5 shows an embodiment of the dual clutch transmission 12" in which the two planetary transmissions 30, 32 are directly coupled one after the other and arranged on the input hollow shaft 14 of the subtransmission A.

This has ion one hand the advantage in terms of construction and production, that the two planetary transmissions 30, 32 can be configured as a single structural unit.

Via the two planetary transmissions 30, 32 then each of the gears of the subtransmission A shifted via the synchronizing clutches 28, can be driven in four possible transmission sages by shifting the clutches K3 and/or the brakes B. the forward gears of the gear wheel sets II and IV (according to FIG. 1) then form non modifiable simple transmission stages.

Beside the possible multiplication of the transmission stages via the individual gear wheel sets I to V fast and comfortable shifting processes can be performed by preferably hydraulic control of the clutches K3 and the brakes B. via the separating clutches K1, K2 the drive moment is in a common manner conducted to the gear wheel sets I, III, V, R and II, IV of the subtransmission A and B.

The invention is not limited to the shown exemplary embodiments.

Depending on the required transmission spacing and the desired number of, forward gears and reverse gears a higher or lower number of gear wheel sets can be arranged in the subtransmission A and in the subtransmission B of the dual clutch transmission 12. Also the constructive circumstance may be important for the arrangement of the two planetary transmissions 30, 32.

The transmission ratios of the two planetary transmissions 30, 34 can be configured different in the lower transmission stage, in order to accomplish defined greater and smaller gear steps. For constructive or spatial reasons the planetary transmissions 30, 34 may also be configured differently (for example without ring gear and with a web with multi-stage planet gears, which mesh with two axially neighboring sun gears).

The dual clutch transmission 12 can also be configured for all wheel drive of the motor vehicle. For this the output shaft 18 can for example be configured as hollow shaft which outputs onto the differential housing of an integrated inter-axle differential. Its output shafts can then drive a rear axle differential and through the hollow shaft the front axle differential 22.

What is claimed is:

1. A shifting arrangement for a dual clutch transmission as change speed transmission for motor vehicles, comprising:
    two coaxially arranged input shafts which are respectively activatable via a respective clutch of a dual clutch, an axially parallel output shaft and gearwheel sets respectively arranged on the input shafts and the output shaft shiftable by means of synchronizing clutches for forming a plurality of forward gears and a reverse gear, said gearwheel sets being divided into a first subtransmission comprising one of the input shafts and a second subtransmission comprising the other one of the input shafts; and
    two shifting units shiftable between two different transmission stages and being assigned to the first subtransmission and the second subtransmission, respectively, wherein the shifting units are each constructed as a planetary transmission which is shiftable between the two transmission stages, wherein each shifting unit has an input element, an output element and a transmission element which is fixable via a respective brake for shifting to a lower one of the transmission stages,
    each planetary transmission further comprising a further clutch, wherein the planetary transmissions are shiftable via the respective further clutch into a higher one of the higher transmission stages having a ratio of 1:1, wherein each further clutch connects two respective elements of each planetary transmission with each other,
    wherein the input element of each planetary transmission is constructed as a ring gear, the output element is constructed as a web which carries planet gears, and the transmission element is constructed as a sun pear which meshes with the planet gears, and which is fixable via the respective brake or is connectable with one of the other input element and the output element of the planetary transmission via the further clutch,
    wherein the further clutch in each planetary transmission is provided between the driving ring gear and the sun gear,
    wherein the brake and the further clutch of one of the planetary transmissions are arranged together with the sun gear on a common hollow shaft.

2. The shifting arrangement of claim 1, wherein a first one of the shifting units is positioned on the input shaft of one of the first and second subtransmissions, and a second one of the shifting units is positioned in force flux downstream of the gearwheel sets (I to V, R) of the first and second subtransmissions on the output shaft.

3. The shifting arrangement of claim 1, wherein a first one of the shifting units is arranged adjacent the dual clutch on the input hollow shaft of the first subtransmission and a second one of the shifting units is arranged on the input shaft of the second subtransmission.

4. The shifting arrangement according to claim 1, wherein the two shifting units are directly positioned one after the other on an input shaft of one of the first and second subtransmission.

5. The shifting arrangement according to claim 1, wherein the two planetary transmissions are constructed substantially identical.

6. The shifting arrangement according to claim 1, wherein the two planetary transmissions have different transmission ratios in a lower one of the transmission stages.

* * * * *